United States Patent [19]

Sebald

[11] 4,355,861
[45] Oct. 26, 1982

[54] DEVICE FOR HEATING THE FRONT LENS OF A TELEVISION CAMERA

[75] Inventor: Richard Sebald, Wiesenttal, Fed. Rep. of Germany

[73] Assignee: Grundig E.M.V., Fuerth, Fed. Rep. of Germany

[21] Appl. No.: 143,930

[22] Filed: Apr. 24, 1980

[30] Foreign Application Priority Data

May 30, 1979 [DE] Fed. Rep. of Germany ....... 2921927

[51] Int. Cl.³ .............................................. G02B 11/04
[52] U.S. Cl. ..................................... 350/61; 219/201; 219/522; 219/543; 350/253
[58] Field of Search ............... 219/201, 203, 219, 521, 219/522, 543; 88/40; 350/61, 66, 253; 354/74; 338/308, 323

[56] References Cited

U.S. PATENT DOCUMENTS

| | | | |
|---|---|---|---|
| 1,791,254 | 2/1931 | Van Brockdorf | 350/253 |
| 2,442,913 | 6/1948 | Abrams et al. | 350/253 |
| 3,495,259 | 2/1970 | Rocholl et al. | 219/522 |

*Primary Examiner*—Volodymyr Y. Mayewsky
*Attorney, Agent, or Firm*—Kane, Dalsimer, Kane, Sullivan and Kurucz

[57] ABSTRACT

A device for heating the front lens of a television camera to prevent an interfering moisture on the lens which includes a heating unit, detachable from the lens tube, comprising a front disc or lens attached to a support plate; a rear disc or lens also attached to said support plate so as to form a sealed chamber between the front and rear disc; and heat coatings deposited on the chamber side surface of the front disc for heating purposes.

16 Claims, 3 Drawing Figures

DEVICE FOR HEATING THE FRONT LENS OF A TELEVISION CAMERA

FIELD OF THE INVENTION

The present invention relates to a heating device for the front lens of a camera, particularly a television camera.

BACKGROUND OF THE INVENTION

Presently there is provided in television camera devices for preventing interfering moisture which may come to be deposited on the front lens portion of the camera. In the typical lens assembly construction, a lens tube is provided having a front disc and a rearwardly spaced planar-glass disc tightly cemented into the tube. A chamber is provided between the front disc and the rear disc and serves as an isolating air buffer. A heating ring is usually provided and mounted between the planar-glass disc and the objective for heating purposes to prevent the deposit of moisture. While this will prevent interfering moisture, such an arrangement requires that the heating ring have a high heat capacity to enable it to heat the front disc through the planar-glass disc and the air buffer. This has a number of drawbacks included of which is the waste of energy.

In addition, such an arrangement heats the inner space of the camera and usually requires the constant interruption of the current supply to the heating ring so as to avoid interference with the cameras electronic operation.

Also, should a defect occur in the heating ring, a considerable expense is incurred in making repairs since the entire lens tube assembly must be removed and replaced.

SUMMARY OF THE INVENTION

Accordingly, it is a principal object of the present invention to provide a device for heating the front lens of a television camera with said device being of a relatively simple and improved serviceable nature; having a front disc and heating device separable from the lens tube and being replaceable in nature.

Another object of the present invention is to provide for such a heating device which effectuates satisfactory elimination of moisture while having a relatively low current demand.

In accordance with the foregoing, the present invention provides for the heating of the front lens of a television camera by placing a heating ring directly on the inside surface of the front disc.

This heating ring is in the form of heat coatings deposited on the inside surface of the front disc, and arranged so as not to interfere with the objective. This in turn is removably mounted on a support plate along with a rearwardly spaed planar-glass disc to form a front lens heating unit. A heat zone is now formed between the front disc and the rearwardly spaced disc, thereby reducing the high heat capacity previously necessary, resulting in a lower current requirement.

In addition, the front disc with the heat coatings thereon and the planar-glass disc, both mounted on the support plate, are attached to the lens tube so that should the heating ring become defective, the heating unit or just the front disc may be readily removed and replaced, increasing its serviceability and decreasing the cost of such replacement.

BRIEF DESCRIPTION OF THE DRAWINGS

The above mentioned and other features and objects of the invention will become more apparent by reference to the following description which is to be taken in conjunction with the drawings.

FIG. 1b is an enlarged side view along section II—II of FIG. 1a;

DETAILED DESCRIPTION OF THE PREFERRED EMBODIMENT

Figure 1A:
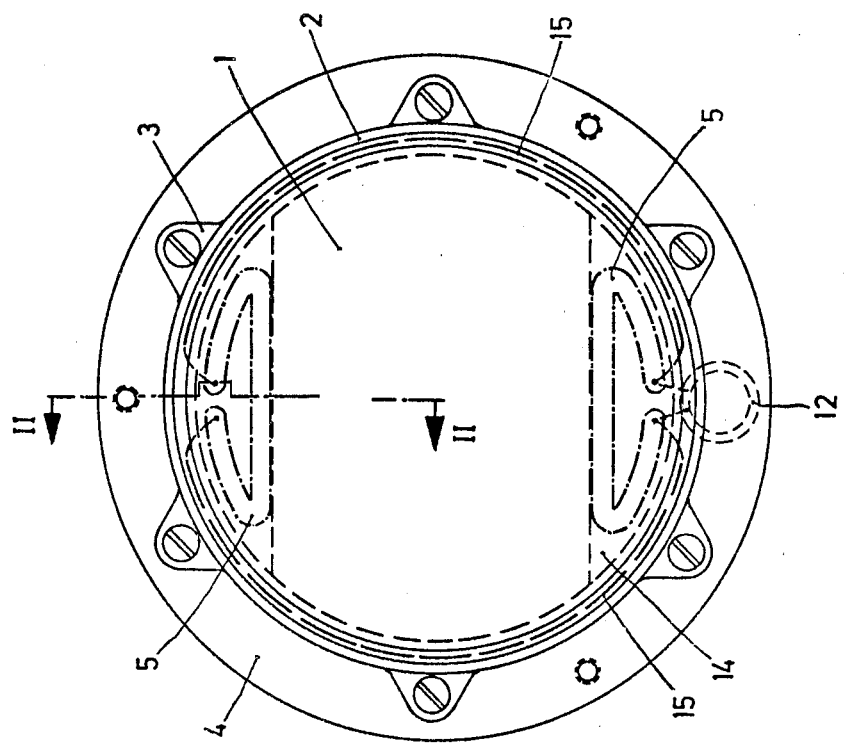
FIG. 1a is a plan view of a front disc for a television camera having a heating device with removed objective, incorporating the teachings of the present invention.

With regard now to the figures, a front disc or lens 1 of a television camera (not shown) is provided and affixed, possibly by cement, in a retaining ring 2. The retaining ring 2 is provided about its circumference with a plurality of mounting means 3 by which the retaining ring may be mounted on a support plate 4, possibly via mounting screws as shown.

On the inside surface of front disc 1, there is provided two segment like heat coatings 5 which may be evaporated on said inside surface. These two opposite segments are generally indicated by the dot-dash line shown in the Figures.

The heat coatings 5 on the inside of front disc 1 may be so arranged that they do not interfer with the objective while incompassing the largest possible area. In this regard, considering the objective and the 3:4 ratio utilized in television camera operation, the smallest front disc cross-sectional area is selected, with the remaining area of the front disc available to be utilized for heat segments.

Figure 1B:
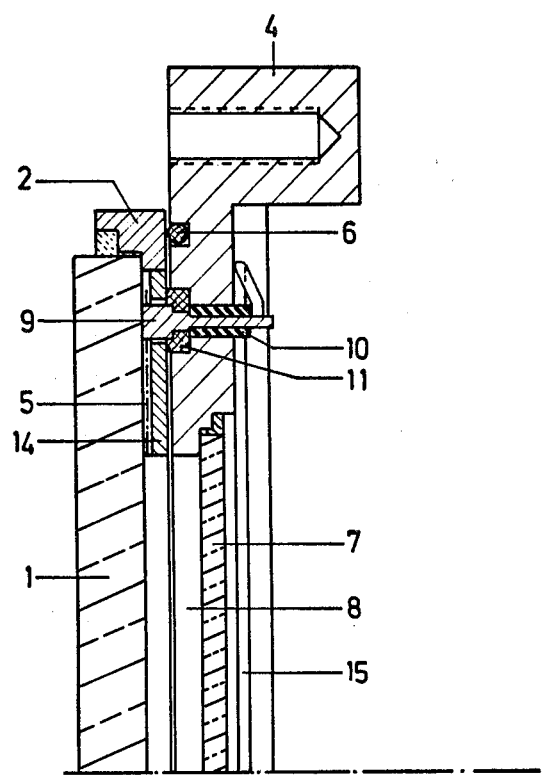

In FIG. 1b there is shown a sectional view of the heating arrangement for the upper half of the front disc. As depicted, the front disc 1, with the evaporated heat coatings 5 thereon, is affixed in the retaining ring 2 which in turn is fixedly mounted on the support plate 4. A small space exists between the retaining ring 2 and the support plate 4 and a sealing ring 6 is provided in an annual groove in the support plate so as to provide an air tight seal as between those two elements.

On the opposite or rear portion of the support plate, spaced a distance rearward of the front disc, a rear planar-glass disc or lens 7 is affixed, also possibly by cementing. This now defines a heat zone which is a sealed hollow chamber 8 between the front and rear discs.

To effect a connection with the heat coatings 5, contact nipples 9 are provided and are yieldingly mounted in the support plate 4. In that an electrical heating circuit is to connect to said nipples, electrical insulation of the support plate 4 from the contact nipples 9 is provided by an insulating bushing or jacket 10, possibly made of ceramic, pressed into the support plate 4 interposed between said plate and the nipple which extends therethrough. In addition, a sealing disc 11, which may be elastic in nature, is provided in the support plate to provide contact pressure for the nipples and in addition for sealing purposes.

A thermostat 12 is provided and may be maintained in the support plate 4 as shown, to regulate the heating provided by the heat coatings 5. The thermostat 12 may be connected to the individual contact nipples 9 by way of insulated connecting wires 15.

Figure 2:
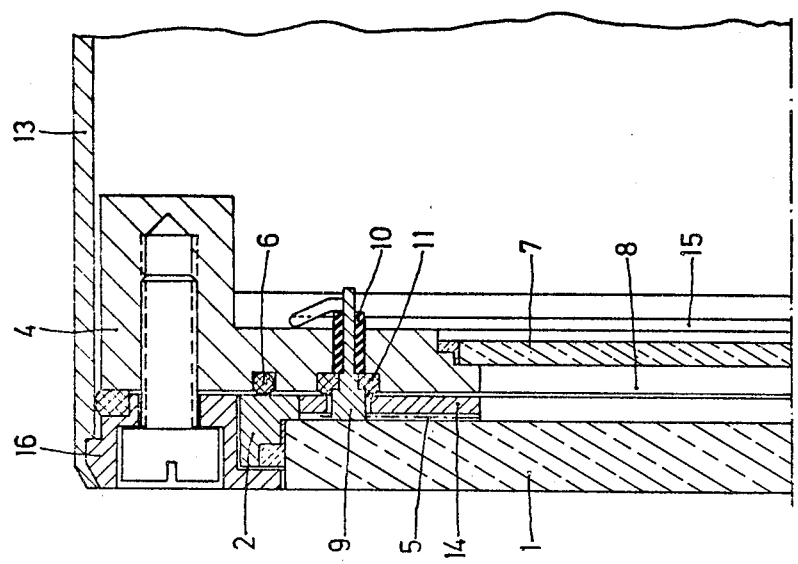
FIG. 2 is an enlarged side view in a section of the heated front disc similar to FIG. 1b, however with the objective in place.

In order to join the described arrangement with the lens tube 13 (shown in FIG. 2) the simplest means would be by way of pushing the lens tube 13 with pressure ring 16 over the completed unit till abutment and connect it thereto via a screw and thread as shown. If a defect was found in the heating device, the entire arrangement may readily be removed from the lens tube by removing the pressure ring 16 or means maintaining the arrangement thereto. In addition, should it just be necessary to replace the front disc 1 and heat coatings 5 thereon, this too may be accomplished by removing the retaining ring 2.

In addition, a drying means 14 may also be provided in the chamber 8 between the front disc 1 and rear disc 7, to prevent moisture or precipitation that might exist or develope in the chamber 8 so as to insure effective operation. As is evident, this may also be conveniently located in the same sections occupied by the heat coatings 5 so as not to interfere with the objective.

Also, the configuration of the heat coatings 5 may vary as desired, and an alternate form may be that of a heating ring evaporated onto the front disc about its circumference.

It should be noted that while a preferred embodiment of the invention has been disclosed and described in detail herein, its scope should not be limited thereby, rather its scope should be determined by that of the appended claims.

What is claimed is:

1. A device for heating the front lens of a camera comprising:
   a support means;
   a transparent front lens supported by said means;
   a transparent rear lens supported by said means;
   a chamber disposed between said front and rear lens; and
   an electrical heating means located in said chamber and capable of heating the front lens so as to prevent interfering moisture which may come to be deposited thereon.

2. A device in accordance with claim 1 wherein said heating means comprises at least two oppositely disposed heating means located adjacent the chamber side surface of the front lens.

3. A device in accordance with claim 2 wherein said heating means comprise heat coatings deposited on the chamber side surface of the front lens.

4. A device in accordance with claims 1, 2 or 3 which further includes at least one contact means adapted to be connected to an electrical heating circuit, with said contact means serving to contact said heating means.

5. The device in accordance with claim 4 wherein said support means is provided with said contact means but electrically insulated therefrom.

6. The device in accordance with claim 5 wherein the support means is electrically insulated from the contact means by an insulating bushing pressed into the support means and a sealing disc, wherein said contact means is guided in said bushing into an abutment relationship with said sealing disc.

7. A device in accordance with claim 1 which further includes a retaining ring; said front disc is maintained in said retaining ring which in turn is detachably mounted to said support means; and a sealing means is provided between said retaining means and said support means.

8. A device in accordance with claim 7 wherein said front lens and said rear lens are cemented air tight into said retaining means and said support means respectively.

9. A device in accordance with claim 1 wherein a drying means is provided in said chamber to remove moisture or precipitation that might exist or develope in said chamber.

10. The device in accordance with claim 1 which further includes an electrical heating circuit connected to said heating means; and a thermostat is provided and connected to said circuit.

11. A device in accordance with claim 1 wherein said device is detachably maintained in a lens tube for a camera.

12. A device which is detachably maintained in a lens tube for heating the front lens of a television camera comprising:
    a support means;
    a retaining means;
    a transparent front lens mounted in said retaining means which in turn is mounted on said support means;
    a transparent rear lens supported by said support means;
    a chamber disposed between said front and rear lens;
    an electrical heating means located in said chamber and comprising at least two oppositely disposed heat coatings deposited on the chamber side surface of the front lens;
    at least one contact means adapted to be connected to an electrical heating circuit, with said contact means serving to contact said heating means; and
    wherein said heating means is capable of heating the front lens so as to prevent interfering moisture which may come to be deposited thereon.

13. The device in accordance with claim 12 wherein said support means is provided with said contact means but electrically insulated therefrom by an insulated bushing pressed into the support means and a sealing disc, wherein said contact means is guided in said bushing into an abutment relationship with said sealing disc.

14. The device in accordance with claims 12 or 13 wherein said front and rear disc are cemented air tight into said retaining means and support means respectively; said retaining means is detachably mounted to said support means and a sealing means is provided between said retaining means and said support means.

15. The device in accordance with claim 12 which includes an electrical heating circuit connected to said contact means and a thermostat is provided and connected to said circuit.

16. The device in accordance with claim 12 wherein a drying means is provided in said chamber to remove moisture or precipitation that might exist or develope in said chamber.

* * * * *